US009527608B1

(12) United States Patent
Sotnikov et al.

(10) Patent No.: US 9,527,608 B1
(45) Date of Patent: Dec. 27, 2016

(54) ELF AND VLF ANTENNA AND RELATED METHODS

(71) Applicant: The United States of America as represented by the Secretary of the Air Force, Washington, DC (US)

(72) Inventors: Vladimir Sotnikov, Springboro, OH (US); Tony Kim, Xenia, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 14/954,031

(22) Filed: Nov. 30, 2015

Related U.S. Application Data

(60) Provisional application No. 62/085,789, filed on Dec. 1, 2014.

(51) Int. Cl.
| | | |
|---|---|---|
| *B64G 1/54* | (2006.01) | |
| *H01Q 1/28* | (2006.01) | |
| *H01Q 7/00* | (2006.01) | |
| *H01Q 21/29* | (2006.01) | |

(52) U.S. Cl.
CPC ........ *B64G 1/54* (2013.01); *H01Q 7/00* (2013.01); *H01Q 21/29* (2013.01)

(58) Field of Classification Search
CPC ............ H04B 13/00; G21K 1/00; H01Q 1/288
See application file for complete search history.

(56) References Cited

U.S. PATENT DOCUMENTS

| 5,038,664 A * | 8/1991 | Eastlund ................. G21K 1/00 376/100 |
| 2006/0044176 A1 | 3/2006 | Papadopoulos |
| 2012/0223253 A1* | 9/2012 | Papadopoulos ........ H01Q 1/288 250/492.1 |

OTHER PUBLICATIONS

Golubyatnikov, Excitation of electrostatic and whistler waves by a magnetic type antenna, Sov. Phys. J. Exp. Theor. Phys., 94, 124, 1988.
Karpman, Resonance cones of ring antennas in a magnetized plasma, Sov. Fiz. Plasmy, 12, 836, 1986.
Karpman, Electromagnetic field created by a dipole exciter in an anisotropic medium, Phys. Lett., 121A, 4, 164, 1987.
Sgadeev, To the Theory of Magnetosonic Turbulence, Sov. Phys. JETP Letters, 26 (1977) 582.

(Continued)

*Primary Examiner* — Wyatt Stoffa
*Assistant Examiner* — Sean Luck
(74) *Attorney, Agent, or Firm* — AFMCLO/JAZ; Jason Sopko

(57) ABSTRACT

A method of reducing densities of harmful charged radiation belt particles is includes providing a space-based antenna having a first antenna portion and second antenna portion. The first antenna portion and the second antenna portion are oriented such that their loop planes are perpendicular with respect to the magnetic field of the Earth. The first antenna portion and the second antenna portion are energized with a first frequency and a second frequency, respectively, wherein the first frequency and the second frequency satisfy the relationship that the ratio of the first frequency to the second frequency is equal to the ratio of the second radius to the first radius. The trajectory of energetic particles in the radiation belt, such that the trajectories of energetic particles are shifted into a loss cone.

1 Claim, 3 Drawing Sheets

(56) References Cited

OTHER PUBLICATIONS

Fiala, Whistler excitation by transformation of lower oblique resonance waves on density perturbations in the vicinity of a VLF antenna, Plasma Phys. Contr. Fusion, 29, 109, 1511, 1987.
Sotnikov, Excitation of sideband emissions by a modulated electron beam during the CHARGE-2B mission, Journ. Geophys. Res., vol. 99, p. 8917, 1994.
Sotnikov, Excitation of Sidebands Due to Nonlinear Couipling between a VLF Transmitter Signal and a Natural ELF Emission, Journ. Geophys. Res., 96, 11363, 1994.
Sotnikov, Structure of the near zone electric field and the power radiated from a VLF antenna in the ionosphere, Radio Sci., 28, 6, 1087, 1993.
Wang, VLF/ELF Radiation Patterns of Arbitrarily Oriented Electrical and Magnetic Dipoles in a Cold Lossless Multicomponent Magenetoplasma, Journal of Geophysical Research,vol. 77, No. 7, p. 1774, 1972.
Wang, On VLF Radiation Resistance of an Electric Dipole in a Cold Magnetoplasma, Radio Science, vol. 5, No. 3, p. 605, Mar. 1970.

\* cited by examiner

ELF AND VLF ANTENNA AND RELATED METHODS

Pursuant to 37 C.F.R. §1.78(a)(4), this application claims the benefit of and priority to prior filed Provisional Application Ser. No. 62/085,789, filed 1 Dec. 2014, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to antennas and, more particularly, to antennas suitable for Very Low Frequency (VLF) or Extremely Low Frequency (ELF) transmissions.

BACKGROUND OF THE INVENTION

Very low frequency or VLF has a generally accepted definition of radio frequencies (RF) in the range of 3 kHz to 30 kHz and whereas Extremely low frequency (ELF) has a generally accepted definition of electromagnetic radiation with frequencies from 3 Hz to 3 KHz.

Due to the the difficulty of fabricating antennas configured to radiate the long waves of the VLF and ELF bands, such antennas have been used in relatively few communication systems. While these bands are capable of modulation some extremely low bitrate data, they have found usefulness in penetrating sea water and rock, and enable Subterranean or sub oceanic radio communications.

Conventional means of transmitting in these bands necessitate the use of long power lines, or earthed dipoles, as leads. These leads could be on the order of several kilometers long. Due to the inefficiency of this method, considerable amounts of electrical power are required to energize the antenna.

An additional use for ELF/VLF transmission systems is related to protecting space-based electronic assets from damaging energic radiation particles. Injection of whistler mode waves, the non electrostatic component of a generated ELF wave spectrum, into the ionosphere is effective at reducing the MeV fluxes of damaging energetic particles. Unfortunately, current antenna geometries produce only a weak whistler mode component as a function of total power consumption (low efficiency), and those known configurations are impractical for space deployment.

As a result, there exists a need in the art for a compact, high efficiency, ELF/VLF antenna apparatus and related methods for mitigating damaging energetic particles.

SUMMARY OF THE INVENTION

The present invention overcomes the foregoing problems and other shortcomings, drawbacks, and challenges of creating an ELF and VLF antenna having efficient production of electromagnetic whistler waves. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention an Extremely Low Frequency (ELF) and Very Low Frequency (VLF) antenna is provided. The antenna includes a first antenna portion energized with a first frequency and a second antenna portion energized with a second frequency. The first antenna is coplanar and concentric with respect to the second antenna. The difference between the first frequency and the second frequency should fall within the ELF range.

According to another embodiment of the disclosed invention, a method of reducing densities of harmful charged radiation belt particles is provided. The method includes providing a space-based antenna having a first antenna portion and second antenna portion. The first antenna portion and the second antenna portion are oriented such that their loop planes are perpendicular with respect to the magnetic field of the Earth. The first antenna portion and the second antenna portion are energized with a first frequency and a second frequency, respectively, wherein the first frequency and the second frequency satisfy the relationship that the ratio of the first frequency to the second frequency is equal to the ratio of the second radius to the first radius. The trajectory of energetic particles in the radiation belt, such that the trajectories of energetic particles are shifted into a loss cone.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
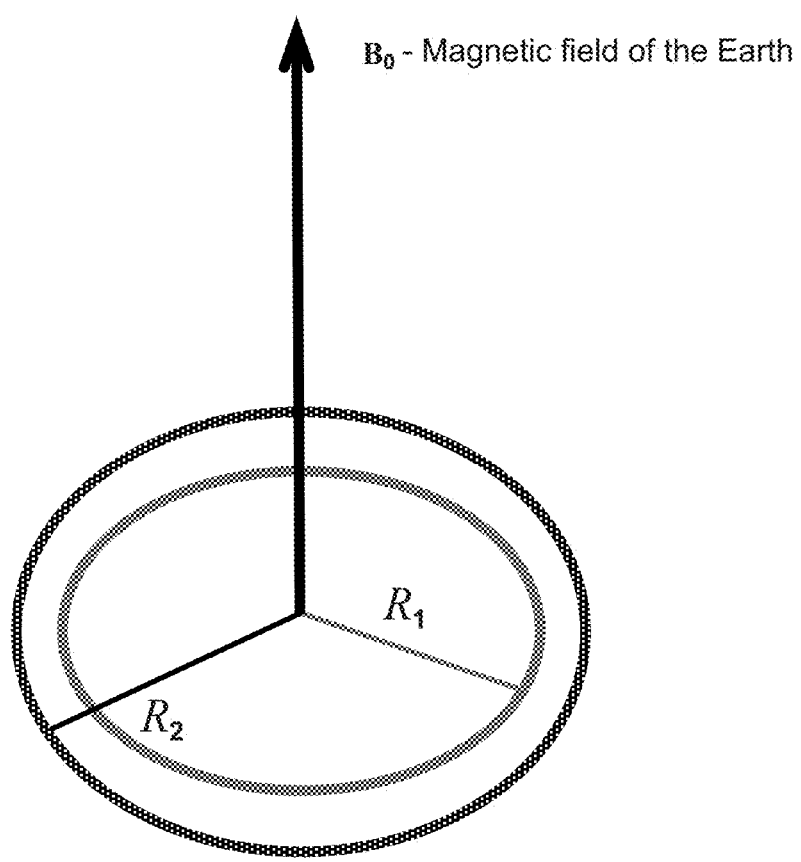
FIG. 1 is a dual loop ELF/VLF antenna according to an embodiment of the disclosed invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The purpose of the invention is to dramatically increase the radiation efficiency of very low frequency (VLF) and extremely low frequency (ELF) antenna. More specifically, embodiments of the disclosed invention are directed to apparatus configured to yield improved efficiency of whistler or electromagnetic (as used herein, "whistler" and "electromagnetic" may be used interchangeably) components of the emitted signal. As a result of the improved efficiency, embodiments of the disclosed invention solve many problems encountered by satellite-based conventional loop and dipole antennas used for excitation of electromagnetic VLF/ELF waves in the ionosphere. It is noted that prior art apparatus configurations of conventional loop and dipole antennas placed on LEO satellites revealed whistler or electromagnetic efficiencies no greater than 3%.

Prior to this invention, such radiation inefficiency was a significant limiting factor for space-based deployment of antennae capable of use in the VLE/ELF range. As will be explained herein, the disclosed invention may be configured for use in various methods that take advantage of the improved electromagnetic or whistler emissions.

The disclosed invention finds uses in the field of military and commercial applications involving areas of active space experiments for removal of highly energetic particles in the ionosphere that are harmful to military and commercial satellite electronics, VLF/ELF communications, to locate and probe underground structures, and for different commercial applications.

The disclosed invention takes advantage of a parametric VLF/ELF antenna for excitation of electromagnetic waves in the ionosphere with radiation efficiency far exceeding existing conventional antenna systems. The disclosed approach may utilize two concentric loop antennas (or, in other embodiments, a loop and dipole, or other combinations of parametric antenna may be employed to achieve design objectives) transmitting at slightly different frequencies. Each loop antenna excites the predominantly electrostatic component of the VLF wave spectrum in the form of Lower Oblique Resonance (LOR) oscillations. Nonlinear interaction of LOR waves creates a region proximate the loop antennas that yields performance tantamount to a much larger antenna, simultaneously re-radiating the VLF and ELF wave energy with an order of magnitude greater radiation efficiency.

It is noted that the disclosed invention efficiently radiates in the electromagnetic (EM) portion of the VLF as well as ELF wave spectrum. This new approach dramatically improves radiation efficiencies, and make space-based VLF/ELF antennas feasible. The disclosed approach may utilize two loop antennas transmitting at slightly different frequencies from the VLF range. The majority (in some instances, approximately 97%) of the energy radiated by the loop antenna's power goes directly into the quasi-electrostatic part of the VLF wave spectrum, namely, to excite LOR oscillations. Also, in the vicinity of the antenna system, due to parametric interaction of LOR waves, excited quasi-electrostatic wave energy will be reradiated as the electromagnetic VLF wave energy with an order of magnitude greater radiation efficiency in comparison with currently existing conventional antenna systems.

It is well known that the high energy particles in the radiation belts can damage space-based assets. Even with hardening measures, the lifetime and reliability of space systems is often limited by the steady degradation caused by these particles. This can be mitigated by implementation of the disclosed invention which reduces the life time of the energetic particles with high power electromagnetic VLF/ELF waves injected into the magnetosphere from LEO/GEO satellites. The main challenge in this approach is, however, to design viable antenna that efficiently radiates in electromagnetic (EM) portion of the VLF/ELF wave spectrum. The disclosed invention fills this role efficiently. Parametrically excited electromagnetic VLF/ELF waves are able to propagate large distances away from the antenna system.

With attention to FIG. 1, the first antenna generates short scale quasi-electrostatic LOR oscillations in the volume around an antenna with frequency $\omega_1$ ($s+\epsilon)\omega_{LH}$, where parameter s has been found to produce acceptable results between 2 and 10, $\epsilon$ should be less than 0.25, and $\omega_{LH}$ is the lower hybrid resonance frequency. The second antenna generates short scale quasi-electrostatic LOR oscillations in the volume around an antenna with frequency $\omega_2 \sim s\omega_{LH}$. The first antenna and second antenna may be referred to as the first antenna portion and second antenna portion of the VLF/ELF antenna. Parametric interaction of the LOR waves with frequencies $\omega_1$ and $\omega_2$ leads to generation of electromagnetic VLF whistler waves on combination frequency $\Omega_+=\omega_1+\omega_2$ and ELF waves with the frequency $\Omega_-=\omega_1-\omega_2$. It is noted that the two concentric loop antennas with radii $R_1$ and $R_2$ may be oriented in the plane perpendicular to the magnetic field of the Earth. The antenna radius of the first loop antenna is smaller than the antenna radius of the second loop antenna wherein $R_2$ ($R_1<R_2$). Antenna radii are chosen to satisfy the condition $R_1*\omega_1=R_2*\omega_2$ wherein the frequency in the first loop antenna is slightly larger than the frequency in a second loop antenna ($\omega_1(\omega_1>\omega_2)$). Likewise, the radii of the first and the second loop antennas may satisfy the relation: $R_1/R_2=\omega_2/\omega_1$. The focal points of both antennas may coincide and will be located at a distance $H=(\omega_{ce}/\omega_1)*R_1$ above the common center of an antenna's loop planes. This antenna configuration allows effective parametric interaction of quasi-electrostatic VLF waves in the near zone of the loop antennas.

It should be noted that the disclosed invention takes advantage the generation of two LOR oscillations (quasi-electrostatic modes with large wave vectors: k>>omega_pe/c, wherein omega_pe is the plasma frequency, and c is the speed of light). In the process of nonlinear interaction waves with much smaller wave vector can be generated such that k_whistler=k1−k2<<omega_pe/c. Here k_whistler is the wave length of the electromagnetic VLF wave-whistler. k1 and k2 are the wave vectors of two LOR waves. So, due to nonlinear interactions, large variations occur in wave vector and shift nonlinearly generated signal to the electromagnetic component of the wave spectrum.

Figures 2A, 2B:
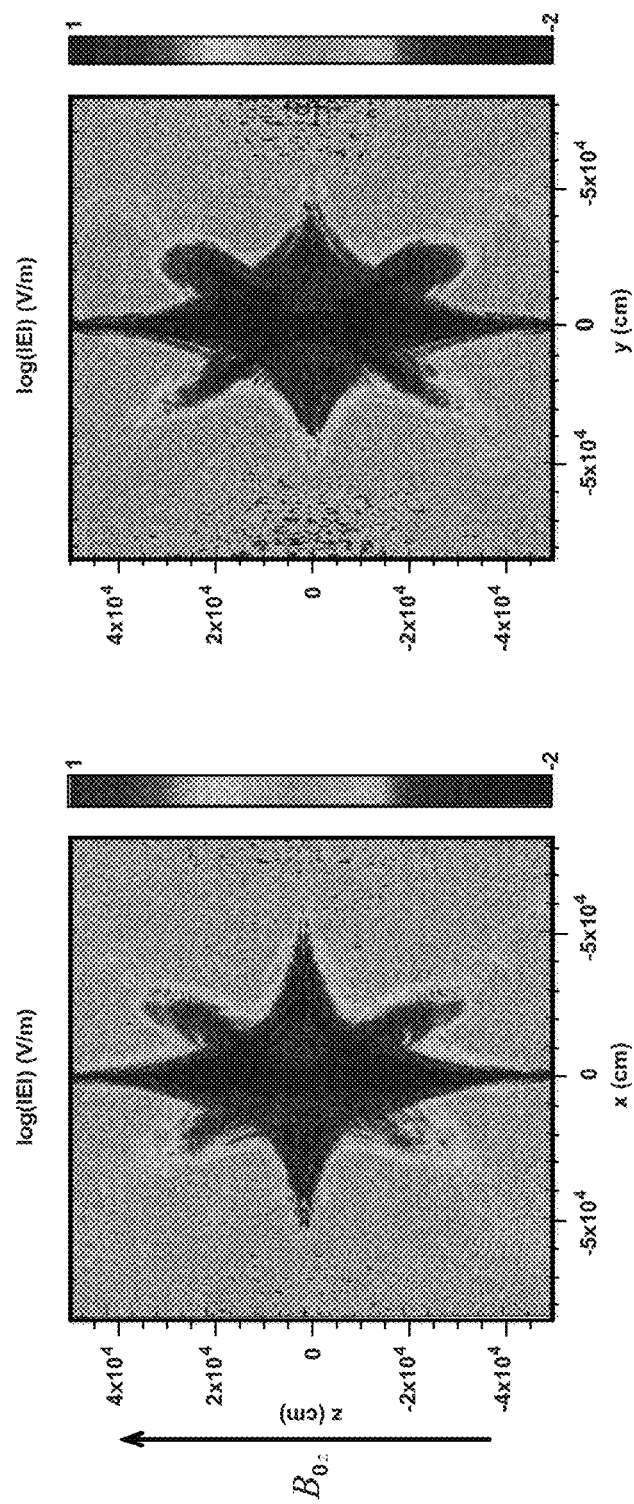
FIGS. 2A and 2B are two dimensional graphical representations of a computer simulation showing the electrical field of a loop antenna energized with a 210 KHz signal.
Figures 3A, 3B:
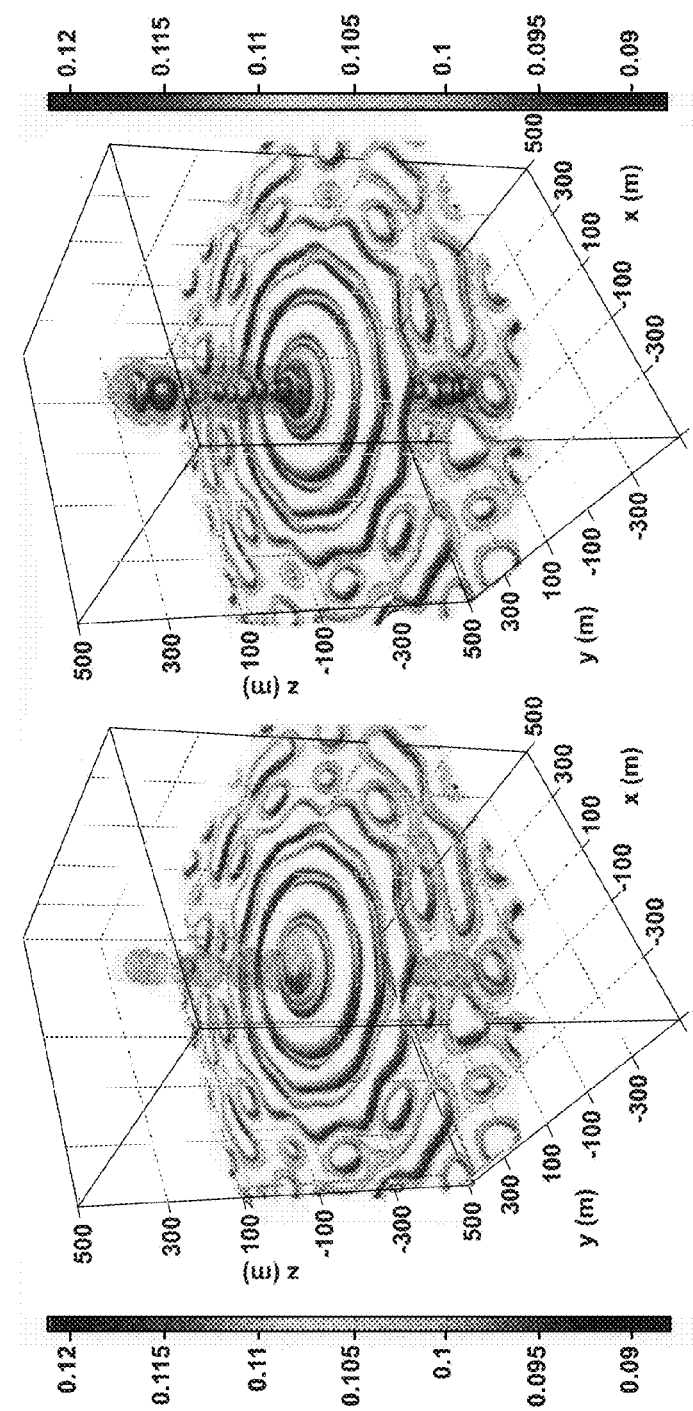
FIGS. 3A and 3B compare the radiated power of a loop antenna (3A) to a parametric antenna comprising a loop antenna in conjunction with a dipole antenna (3B).

Turning attention to FIGS. 2A and 2B, a two dimensional representation of a three dimensional simulation showing the electric field in the vicinity of a loop antenna is provided. FIG. 2A depicts the absolute value of the excited electric field in the (x,z) orientation, while FIG. 2B depicts the absolute value of the excited electric value in the (y,z) orientation. The simulated variables include: a current in the loop antenna, $I_A$, of 100 A, a plasma density, $N_0$, of $10^5$ cm$^{-3}$, an external magnetic field $B_{0z}$, of 0.3 gauss, and a frequency in the loop antenna, f, of 210 KHz. It is noted that the power going into an electromagnetic portion of an excited VLF wave spectrum (the whistler portion), in FIGS. 2A and 3B, is small in comparison with the power going into a quasi-electrostatic LOR oscillations. As a result, the excitations of FIGS. 2A and 2B (the same emission, just graphed from different perspectives), are ill suited for space-based deployment. However, as can be seen in FIGS. 2A and 2B, the lobed peaks of the electric field are confined to relatively well defined regions. It should be noted that the radiated patterns, obtained in the process of PIC simulation, are in good agreement with analytical results. This in turn allows one to reasonably rely on such simulation data (current and future) obtained for the case of parametric antenna generating electromagnetic whistler waves. As a result, the disclosed invention exploits these patterns by augmenting (by way of example, and not limitation), the electric field of 2 A, with a distinct emission from a second antenna, energized with a distinct frequency, to yield non-linear reexcitation and emission of whistler components from the lobed areas.

Turning attention to FIGS. 3A and 3B, a Particle In Cell (PIC) simulation comparing the electric wave magnitudes for a loop antenna (FIG. 3) with a loop and dipole parametric antenna (FIG. 3B) is provided. The following variables apply to the simulation: a simulation time of 2.15e4 ns, 2.49 dipole antenna periods simulated, 8 particle per cell, 5.64e9 total particles, x,y size of 1680 m, z size of 1000 m, $\omega_0$ of 1.131e6 rad/s, $B_0$ of 0.3 G, $\Omega$ of 8.45e4 rad/sec, $n_e$ of 1e5 cm$^{-1}$, $I_0$ of 100 A and $I_d$ of 2 A. FIG. 3A, as a loop antenna excited alone, has been shown to yield a $P_L$ of 0.18 W of whistler portion power. In comparison, a loop and dipole combination parametric antenna field, as shown in FIG. 3B, has been shown to yield a $P_{NL}$ of 2.31 W. As a result, this embodiment of the disclosed invention yields simulated improvements approximately 13 times greater than the loop antenna alone. The simulation results obtained from the PIC simulation, which should be considered as a numerical experiment, strongly support the expected efficiency of the disclosed embodiments of the parametric ELF/VLF antenna described herein.

Embodiments of the disclosed invention may be used to help protect space-based assets from the deleterious effects of energetic particle collisions with semiconductors. Embodiments of the disclosed invention influence the energetic particles via pitch angle diffusion, thus directing them into a loss cone (the loss cone being the set of angles where the particle will strike the atmosphere and no longer be trapped in the magnetosphere).

A simulation of the impact of the disclosed invention on radiation belt particle-densities adjacent the earth was performed using the following assumptions. The cold plasma density, assumed constant along dipole magnetic field lines, was such that the ratio of the electron plasma and cyclotron frequencies was 7.5. As conventional, the distribution of wavenormal angles $\theta k$ was taken to be a Gaussian in tan($\theta k$), with peak at 60° and cutoffs at 45° and 70°, and the width specified by 45°. Similarly, a truncated Gaussian was used for the distribution of wave frequency, with peak at 0.2 fce and cutoffs at 0.1 fce and 0.3 fce with bandwidth 0.1 fce.

The wave population was assumed to be present within 35° of the magnetic equator of the earth. The magnetic amplitude $\delta B_w$=40 pT was used. As the diffusion coefficients scale with $\delta B_w^2$, the results can be easily renormalized. The results are for a single field line; for a drift average, they should be reduced by the appropriate fraction of magnetic local time (MLT) on which the waves are present.

Simulations demonstrated that for amplitudes of 40 pT, VLF-induced precipitation depletes the ~1-MeV electron population in ~3 days (the timespan of major storms). Less energetic (≤0.1-MeV) electrons are depleted in ~2-3 hours.

In selecting the operating frequencies, it is noted that $\omega_1-\omega_2=\omega>\omega_{ci}$ wherein $\omega_{ci}$ is the ion cyclotron frequency. One exemplary configuration that may produce acceptable results for space-based radiation belt remediation (RBR) program (for reducing damage to satellite electronics caused by highly energetic plasma particles) includes two concentric loop antennas with the loop planes placed perpendicular to the magnetic field of the earth with the following input parameters: frequency in the first loop antenna omega1=25 KHz, frequency in the second loop antenna omega2=20 KHz, radius of the first loop R1=10 m, radius of the second loop R2=12.5 m. The amplitude of the current in both loops may be I=100 A. Antennas may be placed in the ionospheric plasma with the density n=10^5 1/cm^3 and the magnetic field B0=0.3 Gauss. In another embodiment of the disclosed invention, configured for implementing the parametric antenna concept, can include the same combination of loop antennas, but with magnetic field oriented in the plane of the antennas. As described earlier, loop/loop, loop/dipole, or other combinations may be employed to achieve design objectives.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of reducing densities of harmful charged radiation belt particles, the method comprising:
    providing a space-based antenna having a first antenna portion and second antenna portion;
    orienting the first antenna portion and the second antenna portion such that their loop planes are perpendicular with respect to the magnetic field of the Earth;
    energizing the first antenna portion and the second antenna portion with a first frequency and a second frequency, respectively, wherein the first frequency and the second frequency satisfy the relationship wherein the ratio of the first frequency to the second frequency is equal to the ratio of the second radius to the first radius;
    generating electromagnetic whistler waves; and
    influencing a trajectory of the particles in the radiation belt, such that the trajectories of the particles are shifted in the presence of the electromagnetic whistler waves into a loss cone.

* * * * *